May 19, 1925.
H. V. NYE
MOTOR CONTROL SYSTEM
Filed Oct. 9, 1922
1,538,209
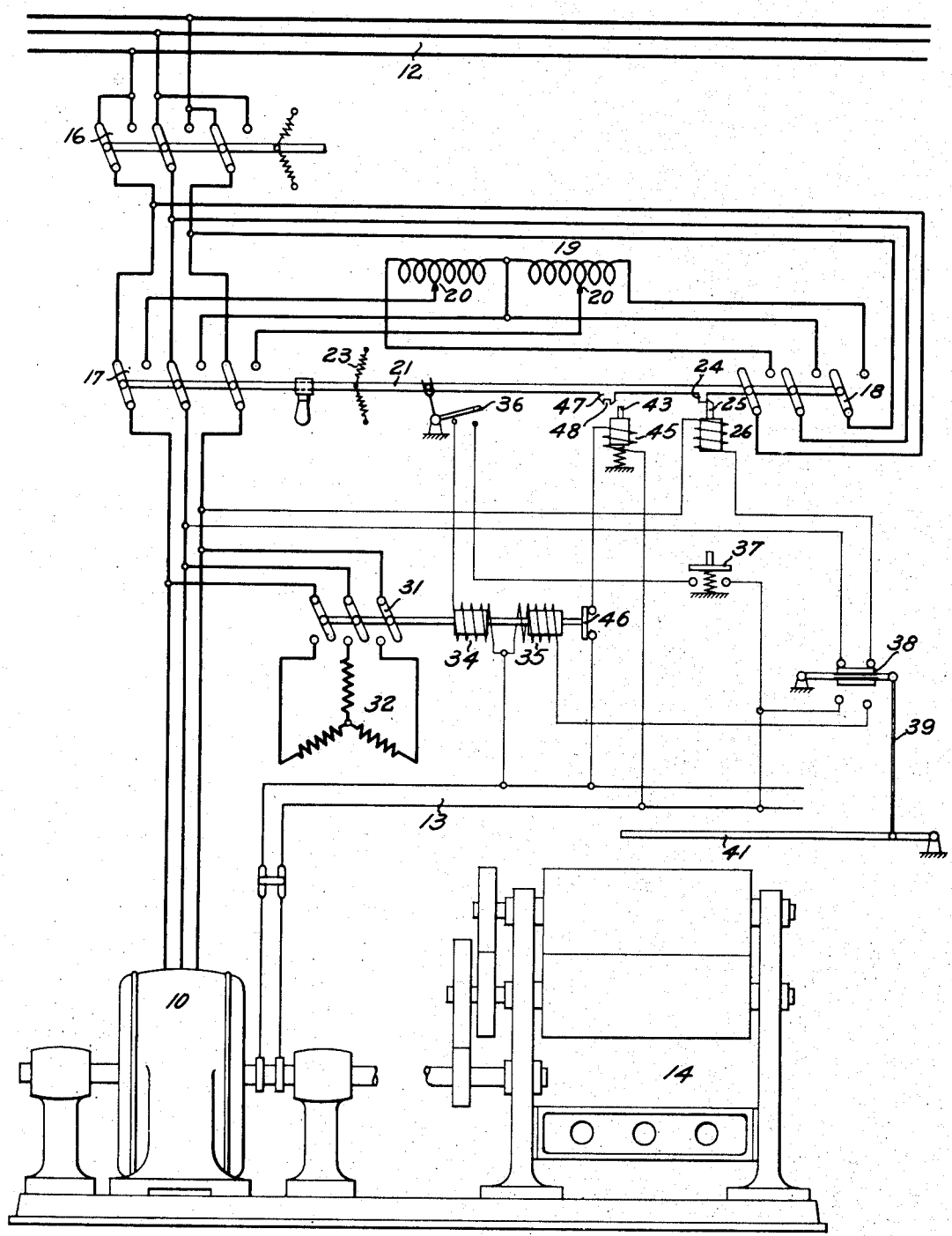
Inventor
H. V. Nye
by G. P. DeWein
Attorney.

Patented May 19, 1925.

1,538,209

UNITED STATES PATENT OFFICE.

HENRY V. NYE, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

MOTOR-CONTROL SYSTEM.

Application filed October 9, 1922. Serial No. 593,208.

*To all whom it may concern:*

Be it known that HENRY V. NYE, a citizen of the United States, residing at West Allis, in the county of Milwaukee and State of Wisconsin, has invented a certain new and useful Motor-Control System, of which the following is a specification.

This invention relates in general to motor control systems, and has more particular relation to the control of synchronous alternating current motors.

In the case of a synchronous motor driving a mill, or a plurality of mills, such as rubber mills or the like, it is especially desirable to be able to stop the mill and motor in a very short space of time, especially in case of an accident to an employee at the mill. The use of clutches and brakes in connection with motors, especially synchronous motors, involves considerable operating and maintenance difficulty and expense which it is quite desirable to avoid, if possible.

The present invention contemplates an improved system of motor control especially adapted to the control of synchronous motors and which provides for the ready starting and stopping of the motor, the stopping being readily accomplished without necessity for auxiliary brakes or the like, and the control of the motor for the purpose of stopping the same being readily effected from a point adjacent or convenient to an employee working at the mill or other machine driven by the motor. The invention further contemplates a control system of such a character as to produce dynamic braking of the motor, and the interlocking of the elements of the control system in such a manner as to insure and necessitate at all times only those operations and the sequence thereof as are desirable and required.

It is an object of this invention to provide an improved system of motor control, especially adapted for the control of synchronous motors, and utilizing the dynamic braking effect of the motor for stopping the latter in a relatively short interval of time, and embodying improved features of control for insuring the necessary and desired sequence of operations in the control of the motor.

This and other objects and advantages are attained by the present invention, various novel features of which will be apparent from the description herein and the accompanying drawings, disclosing an embodiment of the invention, and will be more particularly pointed out in the claims.

In the accompanying drawings, there is disclosed a motor control system in diagrammatic form and embodying features of the present invention. As shown therein, a synchronous motor 10 may have the winding of its stator or armature element supplied with alternating current from a supply circuit 12, and it may have its rotating field supplied with direct current from a supply circuit 13. The motor drives one or more of a series of machines or mills, which may well be considered as rubber or other grinding mills.

The connection between the A. C. supply circuit 12 and the stator winding of the motor 10 may be through a reversing switch 16 and a circuit-controlling means in the form of a double-throw switching mechanism, the latter including switches 17, 18, the former having an "open" position intermediate two "closed" positions and being effective in the position shown, to connect the motor 10 directly to the line, and in the other of its operative positions to connect the motor to the line through a starting transformer 19 which is provided with starting taps 20. As will be apparent, when the switch mechanism 17, 18 is in the latter operative position, the line circuit 12 is connected, through the switch 18, to the terminals of the starting transformer, and the intermediate taps 20 of the latter are connected to the motor through the switch 17.

The switches 17 and 18 are associated with each other for dependent operation by an actuating rod 21 which is biased to an intermediate neutral position, as by means of a spring device 23. The switches are held in "running" position, that is, the position indicated in the drawings, through the engagement of a stop 24 on the rod 21 with a latch 25 mounted on the armature of an electromagnet 26 of the no-voltage type, when this electromagnet is energized to the required degree from one phase of the motor supply circuit.

A switching device 31 is operative, when in closed position, to connect the alternating current winding of the motor 10 to an electrical load circuit or element, here shown in the form of a closed-circuit resistance 32 which may be a three-phase rheostat. The switch 31 is operated to open and closed positions by electromagnets 34 and 35 associated with the actuating rod of the switch. The circuit of the electromagnet 34 which opens the switch 31 is completed through a switch 36, actuated and held in closed position by the rod 21 only when this rod is in the position corresponding to "open" or neutral condition of the switches 17, 18, the circuit of this magnet 34 being further completed through a push-button switch 37 biased to open position and located at any one or more convenient positions. The circuit of the closing electromagnet 35 is completed through a switch 38 when the latter is actuated from its normal operating position, in which it is shown, to its lower operative position. This switch 38 is actuated to its lower closed position by an operating rod 39 and an actuating lever 41 associated therewith. This actuating lever is preferably located so as to be conveniently actuated by the hand or foot of an operator in the vicinity of the mill 14.

In order to prevent other than the desired operation or sequence of operations in the control of the motor 10, a latch 43 is provided, the same being biased to an upper position, as indicated, by a spring or otherwise, and being actuatable to a lower position by an electromagnet 45 whose circuit is completed through a switch 46, operatively connected to the switch 31 so as to complete the circuit of the electromagnet 45 only when the switch 31 is in open position. This latch 43 cooperates with a stop 47 on the actuating rod 21 of the switches 17, 18, this stop having a recess 48 within which the latch 43 enters when the stop is in position corresponding to open position of the switches 17, 18 and the electromagnet 45 is de-energized because of the switch 46 being open. Through this provision of the latch 43 and its operating means, it is insured that upon opening of the connection between the line circuit and the motor 10 and the closure of the switch 31 to connect the three-phase resistance 32 to the alternating current winding of the motor, the switches 17, 18 are held in open position, by engagement of the latch 43 in the recess 48 of the stop 47, until such time as the switch 31 is subsequently opened and the switch 46 is thus closed. This provision insures that the motor cannot be started with the resistance 32 connected across the motor terminals.

Assuming that the motor is out of operation, with the switches 17, 18 in their intermediate or open position and the switch 31 open. On actuation of the switches 17, 18 to their operative positions at the right, which actuation is permitted because the electromagnet 45 is energized and hence holds the latch 43 out of the path of the stop 47, the connection between the line circuit 12 and the motor is completed through the switch 18, auto-transformer 19 and switch 17. As the speed of the motor rises to the proper value, the switches 17, 18 are actuated to the operative position at the left, under which conditions the motor is directly connected to the line 12, and the auto-transformer is disconnected from the line and the motor. When the motor is operating at synchronous speed with its circuits properly completed, the latch 25 is moved up into such cooperative position, as shown in the drawing, relative to the stop 24 on the operating rod 21, as to hold the switch 17 in running position, against the effect of the biasing spring 23 which tends to move the switch to intermediate or open position.

Assume that because of accident, or some other reason, it becomes necessary for an operator to bring the mill to a stop in a relatively short interval of time. The operator pulls down on the lever 41 which is located at a convenient point for operation by hand or foot. This operation causes the switch 38 to break the circuit of the electromagnet 26, thus withdrawing the latch 25 and permitting the biasing spring 23 to move the switch 17 to open position. This downward movement of the operating lever 41 completes the circuit of the operating electromagnet 35, causing the switch 31 to be moved to closed position wherein it closes the circuit of the alternating current winding of the motor 10 through the three-phase resistance 32. It will be apparent that the actuation of the switch 31 to closed position causes the opening of the switch 46 and the consequent de-energization of the electromagnet 45, under which condition the latch 43 associated therewith freely enters the recess 48 in the stop 47 associated with the operating rod 21, and the switches 17, 18 are thus held locked in their intermediate or open position.

With the connections just described, the motor operates as an alternating current generator provided with direct current excitation through its rotating field, the armature circuit being completed through the closed-circuit resistance 32. The design of the motor and the resistance 32 are such that the dynamic braking load placed on the machine is sufficient to bring the machine to a dead stop within a relatively short interval of time; in fact, in such a short space of time as to avoid any serious injury to a mill operator who has seen fit, because of imminent danger, to actuate the operating lever 41.

The motor having been brought to a stand still, the switch 31 may be opened by closure of a push-button 37, the switch 36 being in closed position at this time by reason of the fact that the switches 17, 18 and their operating rod are in open or intermediate positions. It will be apparent that if an attempt were made to complete the alternating current circuit of the motor prior to the opening of the switch 31 the rod 21 would be found to be incapable of movement, being held in the position corresponding to open position of the switch 17 by the latch 43. However, with the switch 31 in open position the energizing circuit of the electromagnet 45 is completed so as to cause the latch 43 to be retracted from the stop 47 and permit the rod 21 to be actuated to start the motor again.

If the switch 38 is of the non-return type, that is, if positive actuation of the operating lever 41 or some other part is necessary to return this switch to its upper closed position, it will be apparent that this switch must first be positively actuated to its upper closed position before the motor can be placed in normal running condition, since, otherwise, the operating circuit of the no-voltage magnet 26 cannot be completed and consequently the switch 17 cannot effectively be held in closed position.

It will be apparent that the switch 38 with its operating means may be duplicated at any one or more points so as to permit a person to stop the motor from any of such points.

It will be apparent that there may be modifications as to certain details especially those related to the insuring of the various safety features in the operation of the control system. Among these modifications, it may be noted that instead of breaking the circuit of the no-voltage magnet 26 directly by the switch 38, the circuit of this magnet may be broken by means of an auxiliary switch associated with the switch 31, so arranged as to rupture the circuit of the magnet 26 as the switch 31 is moved toward closed position.

Certain features of the invention disclosed but not claimed herein are claimed in applicant's copending application Serial No. 22616, filed April 13th, 1925, the latter application being a continuation in part of the present application.

It should be understood that the invention claimed herein is not limited to the particular details of construction and design elements shown and described herein, for various modifications will be apparent to one skilled in the art, and the application of features of the control system for purposes other than that described, such as the quick stopping and reversal of mill motors, will likewise be apparent.

It is claimed and desired to secure by Letters Patent:

1. In combination, a motor operative to drive a load, circuit-controlling means between said motor and a supply line, means for holding said circuit-controlling means in operative position, an electrical load element, a switching device between the armature of said motor and said electrical load element for braking purposes and operable independently of said circuit-controlling means, means for maintaining said circuit-controlling means in inoperative position while the armature of said motor is connected to said electrical load, and means for causing the actuation of said switching device to inoperative position and the release of said maintaining means.

2. In combination, a motor operative to drive a load, circuit-controlling means between the armature of said motor and a supply line, an electrical load element, a switching device between the armature of said motor and said electrical load element and operable independently of said circuit-controlling means, means for causing actuation of said switching device, and means operatively dependent upon said circuit-controlling means for permitting actuation of said switching device to inoperative position only when said circuit-controlling means is in inoperative position.

3. In combination, a motor operative to drive a load, circuit-controlling means between the armature of said motor and a supply line, an electrical load element, a switching device between the armature of said motor and said electrical load element, means for causing actuation of said switching device, and means for preventing operation of said circuit-controlling means from inoperative position when said switching device is in position to connect the armature of said motor to said electrical load element.

4. In combination, a motor operative to drive a load, circuit-controlling means between the armature of said motor and a supply line, said circuit-controlling means being biased to inoperative position, means for holding said circuit-controlling means in operative position, an electrical load element, a switching device between the armature of said motor and said electrical load element, means for causing actuation of said switching device, means operatively dependent upon said circuit-controlling means for permitting actuation of said switching device to inoperative position only when said circuit-controlling means is in inoperative position.

5. In combination, a motor operative to drive a load, circuit-controlling means between the armature of said motor and a supply line, said circuit-controlling means being biased to inoperative position, means for holding said circuit-controlling means in operative position, an electrical load element, a switching device between the armature of said motor and said electrical load element, an electromagnetically operated device for actuating said switching device, and means operatively dependent upon said circuit-controlling means for insuring energization of said electromagnetic device to cause actuation of said switching device to inoperative position only when said circuit-controlling means is in inoperative position, and means for insuring that said circuit-controlling means is held in inoperative position at all times while said switching device is in operative position.

6. In combination, a synchronous motor operative to drive a load, circuit-controlling means biased to open position and operative to effectively connect the armature of said motor to a supply line, no-voltage release means for holding said circuit-controlling means in closed position, an electrical load circuit, a switching device for effectively connecting the armature of said motor to said electrical load, an electrically operated device for causing actuation of said switching device, means operatively dependent upon said circuit-controlling means for insuring energization of said electromagnetic device to cause opening of said switching device only when said circuit-controlling means is in open position, means for insuring that said circuit-controlling means is held in inoperative position at all times while said switching device is in closed position, and means operative to actuate said no-voltage release and to cause the actuation of said switching device to closed position.

7. In combination, a synchronous motor operative to drive a load, circuit-controlling means biased to open position and operative to effectively connect the armature of said motor to a supply line, no-voltage release means for holding said circuit-controlling means in closed position, an electrical load circuit, a switching device for connecting the armature of said motor to said electrical load, electromagnetically operated means for causing actuation of said switching device, said actuating means being effective to cause closure of said switching device only upon release of said circuit-controlling means to open position and to cause opening of said switching device only when said circuit-controlling means is in open position, and means comprising an electromagnetically actuated latch co-operative with said circuit-controlling means for insuring that said latter means is held in open position while said switching device is in closed position, the energizing means for said latch comprising a circuit-closing device in the energizing circuit and operatively associated with said switching device whereby the energizing circuit is closed only when said switching device is in open position.

8. In combination, a synchronous motor operative to drive a load, circuit-controlling means biased to open position and operative to effectively connect the armature of said motor to a supply line, means for holding said circuit-controlling means in closed position, said holding means including a latch of the no-voltage release type, an electrical load circuit, a switching device for connecting the armature of said motor to said load circuit, means for actuating said switching device, said actuating means being operative to cause closure of said switching device only when said circuit-controlling means is in open position, means operatively associated with said switching device for insuring that said circuit-controlling means is held in open position while the armature of said motor is connected to said load circuit, said insuring means comprising a stop associated with said circuit-controlling means, an electromagnetically actuated latch co-operative with said stop, a switch operatively associated with said switching device and effective to insure closure of the energizing winding for said latch only when said switching device is in open position, and a controlling device operative interchangeably to insure that said holding means is effective to maintain said circuit-controlling means in closed position and to permit release of said holding means and cause actuation of said switching device to closed position.

9. In combination, a motor operative to drive a load, a starting device, circuit-controlling means biased to open position and operative interchangeably to connect said motor directly to a supply circuit for normal running and indirectly through said starting device for starting purposes, means for releasably holding said circuit-controlling means in operative position corresponding to normal running of said motor, an electrical load, a switching device for connecting the armature of said motor to said electrical load, means for holding said circuit-controlling means in inoperative position when said switching device is in closed position, and means for causing the release of said holding means and the actuation of said switching device to open position.

10. In combination, a motor operative to drive a load, a starting device, circuit-controlling means biased to open position and operative interchangeably to connect said motor directly to a supply circuit for normal running and indirectly through said starting device for starting purposes, means for holding said circuit-controlling means in closed position, an electrical load, a switching device for connecting the armature of said motor to said electrical load, electromagnetically controlled means for causing actuation of said switching device, means operatively dependent upon said circuit-controlling means for permitting effective energization of said electromagnetically controlled means to cause opening of said switching device only when said circuit-controlling means is in open position, and means operative to cause release of said holding means and actuation of said switching device to closed position.

11. In combination, a synchronous motor operative to drive a load, a starting device, circuit-controlling means operative interchangeably to connect the armature of said motor directly to a supply circuit for normal running and indirectly through said starting device for starting purposes, means for holding said circuit-controlling means in closed position, an electrical load, a switching device for connecting the armature of said motor to said electrical load, electromagnetically controlled means for causing actuation of said switching device, means operatively dependent upon said circuit-controlling means for permitting effective energization of said electromagnetically controlled means to cause opening of said switching device only when said circuit-controlling means is in open position, means for insuring that said circuit-controlling means is held in open position at all times while said switching device is in closed position, and means operative to cause release of said holding means and actuation of said switching device to open position.

12. In combination, a synchronous motor operative to drive a load, a starting transformer, circuit-controlling means biased to open position and operative interchangeably to connect the armature of said motor directly to a supply circuit for normal running purposes and indirectly through said transformer for starting purposes, means for holding said circuit-controlling means in closed position, said holding means including a latch of the no-voltage release type, an electrical load circuit, a switching device for connecting the armature of said motor to said load circuit, electromagnetically actuated means for causing the operation of said switching device, said means being effective to cause opening movement of said switching device only when said circuit-controlling means is in open position, means for insuring that said circuit-controlling means is held in open position while the armature of said motor is connected to said load circuit, said insuring means comprising a stop associated with said circuit-controlling means, an electromagnetically controlled latch cooperative with said stop, and a switch operatively associated with said switching device and operative to cause release of said latch only when said switching device is in open position, and means operative interchangeably to insure that said holding means is effective to maintain said circuit-controlling means in closed position and to permit release of said holding means and cause actuation of said switching device to closed position.

13. In a control system for synchronous motors, an electrical load element, instrumentalities operative to effect the connection and disconnection of the armature circuit of the motor with respect to said load element and the alternating current supply line for the motor, and means for causing the connection of said load element to said armature circuit and of said supply line to said armature circuit to be interdependent.

14. In a control system for synchronous motors, an electrical load element, instrumentalities operative to effect the connection and disconnection of the armature circuit of the motor with respect to said load element and the alternating current supply line for the motor, and means for preventing the connection of the armature circuit of the motor to said supply line while said load element is connected to said armature circuit.

In testimony whereof, the signature of the inventor is affixed hereto.

HENRY V. NYE.